Oct. 13, 1931.  A. J. FARRAR  1,826,870
PARKING LIGHT TIMING DEVICE
Filed Oct. 25, 1928
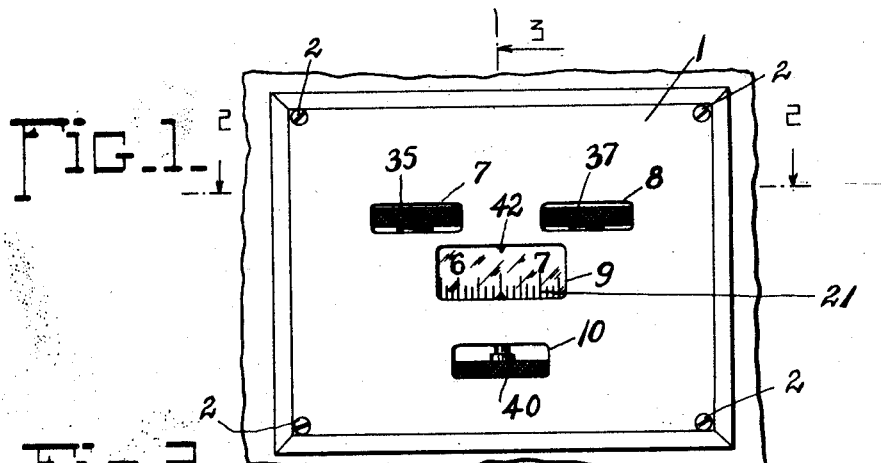
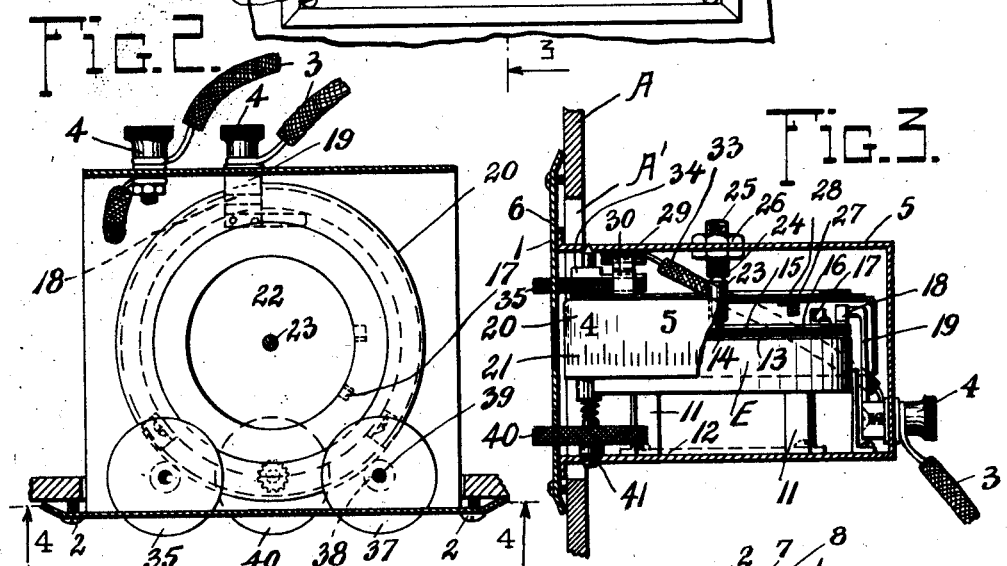
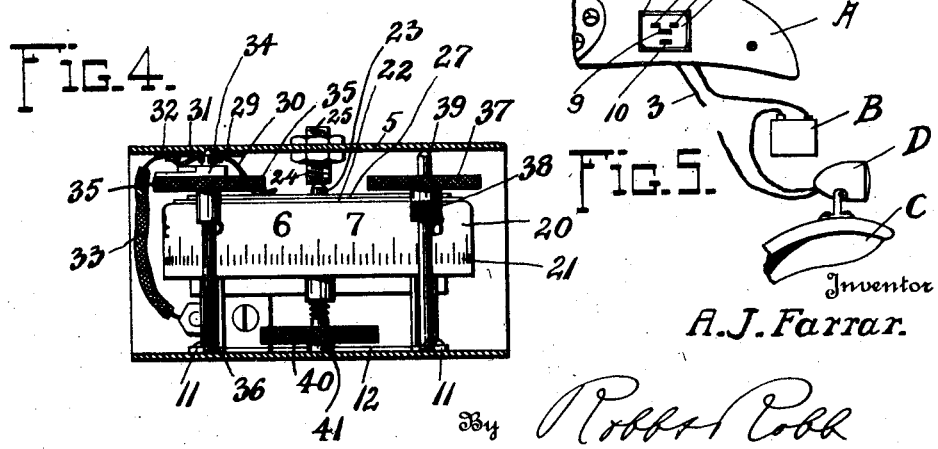
Inventor
A. J. Farrar.
By Robt Cobb
Attorneys Patented Oct. 13, 1931

1,826,870

UNITED STATES PATENT OFFICE

ALVIN J. FARRAR, OF CLEVELAND, OHIO

PARKING LIGHT TIMING DEVICE

Application filed October 25, 1928. Serial No. 315,005.

The primary purpose of this invention is to provide instrumentalities whereby the parking or cowl lights of a motor vehicle are caused to be lighted automatically at a certain predetermined time. This invention has been made in view of conditions noted by me when a person driving a machine must leave the same parked on the municipal streets during a period running from daylight to darkness. Obviously, it might be very inconvenient and somewhat of a nuisance to have to return to the machine for the sole purpose of turning on the light or lights which are brought into operation when the machine is parked. Needless to say, it is undesirable to have the lights of the automobile in operation during daylight.

In attaining the object above noted, I interpose circuit breaking means in a circuit which supplies current to the parking light or lights. These circuit breaking means have associated therewith timing mechanism which, when properly set, functions to close the circuit at a predetermined time.

Inasmuch as the parking light is not availed of during the daylight hours, I propose to provide supplemental circuit breaking and closing mechanism which is manually operable so that the entire device may be rendered inoperative so far as the lighting function is concerned, during the daytime. This circuit breaking means also constitutes the usual switch for turning on the parking light whenever desired; that is, it may be operated to cause lighting of the parking light at any immediate time when the latter is needed, the phase of automatically lighting the light at a future time, being dispensed with when such operation is desired.

I have taken recognition of the fact that the average car of today includes among its dashboard instrumentalities, a clock, and one of the principal features of this invention is the thought of availing of the timing mechanism for my novel parking light arrangement as the time piece usually evident on the dashboard of a machine. An important object of the invention therefore, is to provide timing mechanism which will control the parking light in the manner previously set forth and which also constitutes a time piece for indicating the time of day to a person operating the vehicle. This feature of having the time of day available when the mechanism is about to be set to cause the light to go on at a certain predetermined future time, assumes some little importance when it is borne in mind that the time when a person wishes the light to go on in the future is dependent on or related to the time at which he is setting the device.

A desideratum of no little import is the provision of a device above noted, which is readily adapted for mounting on the dashboard of an automobile which is the conventional place for locating instruments having to do with the operation of a machine, and it is essential that the device be properly operated from the dashboard with as little inconvenience as possible. Accordingly, my novel device is mounted on a panel with the operating members therefor located in the plane face of the panel, and this panel is designed for location in a suitable opening in the dashboard of a motor vehicle.

In devising a mechanism in accordance with my inventive thoughts, I have been confronted with the problem of making an instrument of a very compact nature as there is really not a whole lot of room available behind the dashboard of the average machine. Furthermore, an instrument of a compact nature has other advantages inherent with the property of compactness, and various smaller detailed objects and advantages of the invention as will in part become apparent and in part be hereinafter stated, have arisen with the designing of the devices as above noted. It is of importance that the latter be made in a unit which may be readily applied to any of the dashboards in the construction of automobiles as well as for incorporation into a machine as it is being built.

For a full and more complete understanding of the invention, reference may be had to the following description and accompanying drawings, in which Figure 1 is a view in front elevation of a panel constituting a part of my novel parking light timing instrument.

Figure 2 is a horizontal section taken about on the line 2—2 of Figure 1, developing the location of the terminal connections with respect to the instrument as well as the relative positions of the operating instrumentalities.

Figure 3 is a partial vertical section taken through the center of the device about on the line 3—3 of Figure 1, parts being broken away and other parts shown in elevation to more clearly bring out the details.

Figure 4 is a view from the front taken about on the line 4—4 of Figure 2. It is noted that this is substantially a front view of the timing device with the front panel removed, and Figure 5 is a showing somewhat diagrammatic, bringing out the relation between the device on the dashboard electric power source, and parking light.

While in this instance, I have shown a preferred specific embodiment of the invention, it is to be understood that I am not to be limited to the exact constructions illustrated and described, because various modifications of these details may be provided in putting the invention into practice within the purview of the appended claim. I wish to particularly mention the fact that while I have shown the timing device as associated with the parking light which is usually located on the left rear fender of an automobile, the same is designed to cooperate with equal efficacy with the cowl or rear lights, which are very often availed of as the parking lights of the machine.

Referring first to Figure 5, the essential parts of a motor vehicle with which my invention is related, are dashboard designated A, battery B, fender or mud guard C, and the parking light indicated at D which is mounted on the fender C. My novel timing instrument is carried by a panel 1 and is secured in a suitable opening A1 in the dashboard A, screws 2 being availed of as the medium for fastening the panel 1 to the dashboard. Electric wiring shown at 3 connects in circuit, parking light D, battery B and timing device 1, there being two wires running to the timing device and connected thereto at terminals 4. The making and breaking of the circuit for controlling the lighting of the parking light takes place in the timing instrument in a manner to be hereinafter more fully set out.

A casing member 5 which is of a U-shaped construction open at the sides, has flanges 6 which are secured to the inner face of the panel 1 in any preferred manner as by soldering. It is in this casing 5 that the timing mechanism proper is located and I note that the terminals 4 are mounted on this casing at the back side thereof. The panel 1 is provided with openings 7, 8, 9, and 10 to provide access to the operating instrumentalities and in a manner to be hereinafter made more apparent, and the opening 9 may be covered with some transparent substance, as glass, as this is the opening which is availed of as the observation means for determining the time when the parking light is to be automatically lit.

I employ in this instance a conventional clock mechanism as the clock works of the timing mechanism. This is shown at E. This mechanism is carried by the brackets 11 upstanding from a ring 12, and I wish to emphasize the fact that any suitable clock works of sufficient compactness might well be employed and I have not illustrated nor described the detailed construction of this clock mechanism, because it is not material to the invention. The clock mechanism E functions to cause rotation of plate 13 at an even rate of speed as is the usual operation of clock works. The plate 13 is pivotally mounted on a center pivot 14, and superimposed on this plate 13 is a plate 15 of some insulating material such as mica. The insulating plate 15 carries a ring 16 of good conductive material such as copper. An abutment member 17 also of good conductive material and preferably of a slightly springy or resilient construction, is fastened to the ring 16 in any preferred manner as by soldering, and upstands therefrom. A brush 18 also of conductive material such as copper, engages the ring 16 and is carried by an arm 19 which is operatively fastened to one of the terminals 4. It will be seen from the foregoing, that the circuit from one of the terminals 4 through to the abutment 17 is provided and yet insulated from the remainder of the timing mechanism.

A sort of cup shaped cylindrical member 20 has its cylindrical surface provided with indicia 21, which indicia indicates the time of day down to five minute intervals. Needless to say, there could be twelve hour divisions and between each hour mark, twelve subdivisions indicating five minute intervals. The cup member 20 has an upper plane surface referred to as 22 while its lower end is open so that it may fit over the clock works E. A pivot pin 23 passes through the plane face 22 and has in its lower end, a small recess which fits over pin 14 while the upper end of the pin is pointed as shown at 24, which pointed end fits in a recess in the end of the threaded member 25. Locking nuts 26 are operable to adjust the position of the threaded member 25.

The cup member 20 is of some good insulating material and on the upper surface thereof is located a ring 27 of copper. An abutment member 28 is fastened to the underside of the ring 27 and extends through an opening provided in the face 22. This abutment member 28 is of conductive material such as copper and is adapted to be engaged by the abutment member 17 on the ring 16.

A double brush 29 has one end 30 in constant engagement with the ring 27 while its other end 31 which is of spring construction, is normally spaced a slight distance from the contact 32. A wire 33 leads from the contact 32 to one of the terminls 4 which is not connected with the arm 19.

A cam member 34 is carried by an operating member 35 rotatably mounted on a shaft 36 which has bearing in the upper and lower walls of the casing 5, and this cam member 34 is operable to force the brush end 31 into engagement with the contact 32 as the occasion demands or permit the brush to assume a spaced relation with respect to this contact.

The clock mechanism E is so designed for operation that when the abutment member 17 engages its complemental abutment member 28, the cup member 20 will be rotated at the proper speed to indicate the time of day. Also when these abutments members 17 and 28 are in engagement, we will have a complete circuit running from one of the terminals 4 through arm 19, brush 18, ring 16, abutment member 17, abutment member 28, ring 27 and brush 30, and when the other end of the brush 30 is forced into engagement with the contact 32, the circuit will continue through contact 32 and wire 33 back to the other terminal 4. It will be seen that there are two possible breaks in the circuit. The disengagement of abutment members 17 and 28 will cause a break in the circuit under which condition the parking light will not be lit, or the assuming by the brush 31 of a spaced relation with respect to the contact 32 will cause a like condition. The operating member 35 comprises a disc having a knurled periphery projecting a slight distance through the opening 7 so that it is susceptible of operation through the outside of panel 1. A second operating panel member 37 has a hub portion 38 which is of a roughened nature and this hub portion is in engagement with the cylindrical surface of the cup member 20. The parts 37 and 38 are mounted on a shaft 39 extending from the top to the bottom walls of the casing 5 in the same manner as the shaft 36. It is apparent that the operating member 37 may be rotated to cause a rotation of the cup member 20. This operating member 37 extends through the opening 8 much the same as the part 35 extends through the opening 7.

A third operating member 40 is mounted on a shaft 41 which has bearing in the lower wall of the casing 5 and this shaft 41 is operatively connected with the clock works E so that rotation of the member 40 causes a winding up of the spring in the clock, this being the sole function of the operating member 40.

There are several phases of operation of my novel timing mechanism which must be set forth in order to establish the full advantages thereof. In the first place, assuming that the parking light is not needed at any time, the operating member 35 is availed of to bring the brush 31 out of engagement with the contact 32 which inhibits the lighting of the parking light at all times. Functioning of the clock works E causes rotation of the cup member 20 and indicia 21 through the abutments 17 and 28 to indicate the time of day. Now if it is desired to light the parking light at any immediate time, the operating member 35 is turned so that the brush 31 engages the contact member 32 whereupon the parking light D is lit, the circuit being complete through the abutment members 17 and 28, and brush 31 in contact 32.

Now should a person be desirous of availing of the device as a means for automatically causing the parking light to go on at some predetermined future time, he first operates the member 35 so that brush 31 is brought into engagement with the contact 32. The operating member 37 is then availed of to turn the cup member 20 sufficiently far so that the pointers 42 which cooperate with the indicia 21, indicate the future time in which it is desired the light shall be automatically lit. The person may then leave the machine and the clock works E will function to slowly rotate the ring 16. It will take the difference in time between when the abutment members 17 and 28 will disengage by operation of the operating member 37 to the time indicated by the indicia 21 for these members 17 and 28 to again become engaged, whereupon the parking light goes on and stays lit until it is placed out of operation by manual intervention.

Having thus described my invention, what I claim as new and desire to secure by Letters Patent of the United States, is:—

Timing mechanism for automobile lights of the class described, comprising, in combination, a casing, clock works in said casing, an abutment member included in the clock works and movable by the action of the latter, a disc positioned above the clock works, an abtument member carried by said disc complemental to the abutment member of the clock works, manually operable means for engaging or disengaging the two abutment members aforesaid, and indicia means carried by the disc, said indicia means being movable by operation of the clock work through said abutment members.

In testimony whereof I affix my signature.

ALVIN J. FARRAR.